Nov. 22, 1932.　　G. CLARK　　1,888,452
AIRCRAFT
Filed July 2, 1931　　3 Sheets-Sheet 2
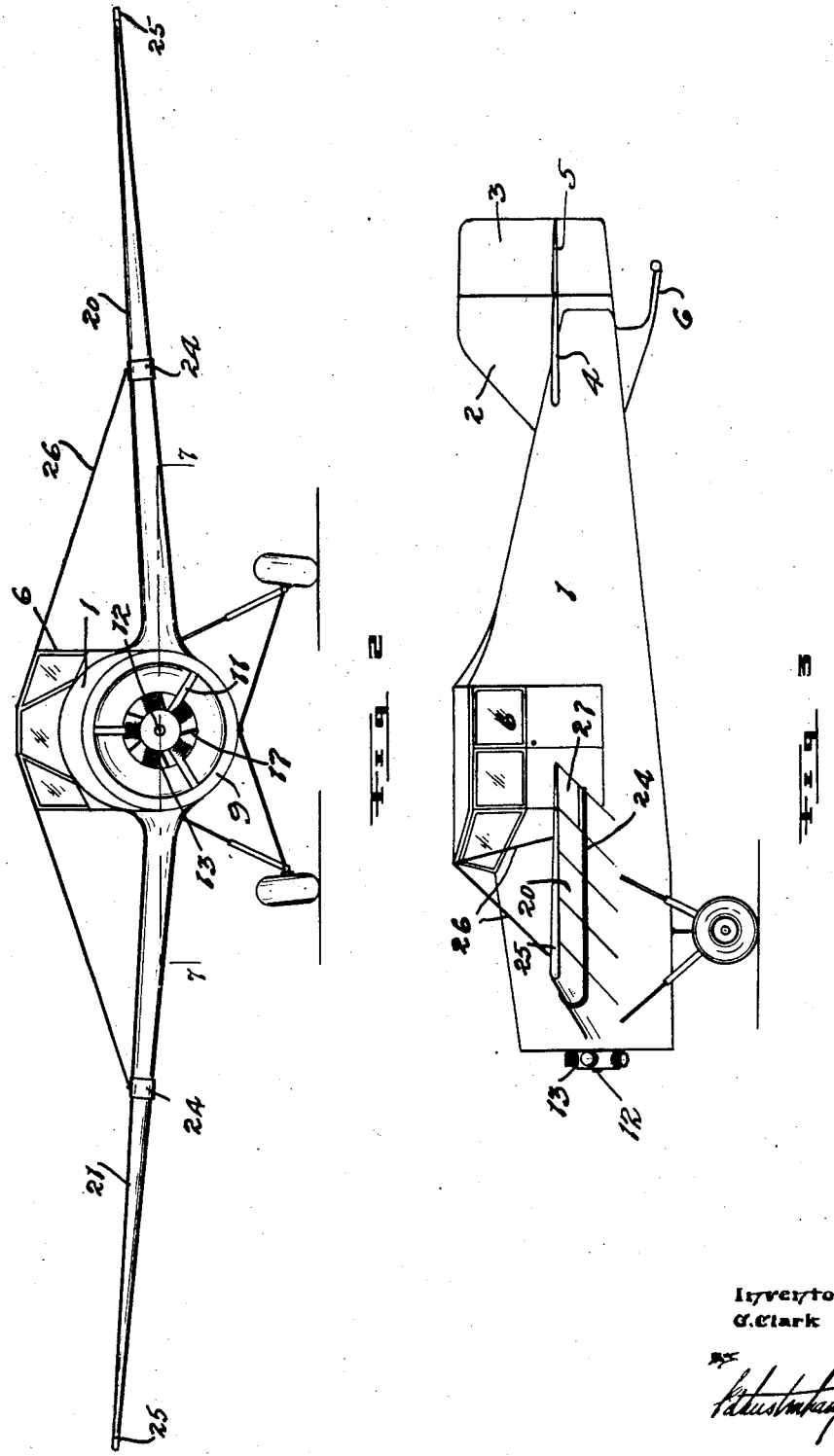
Inventor
G. Clark

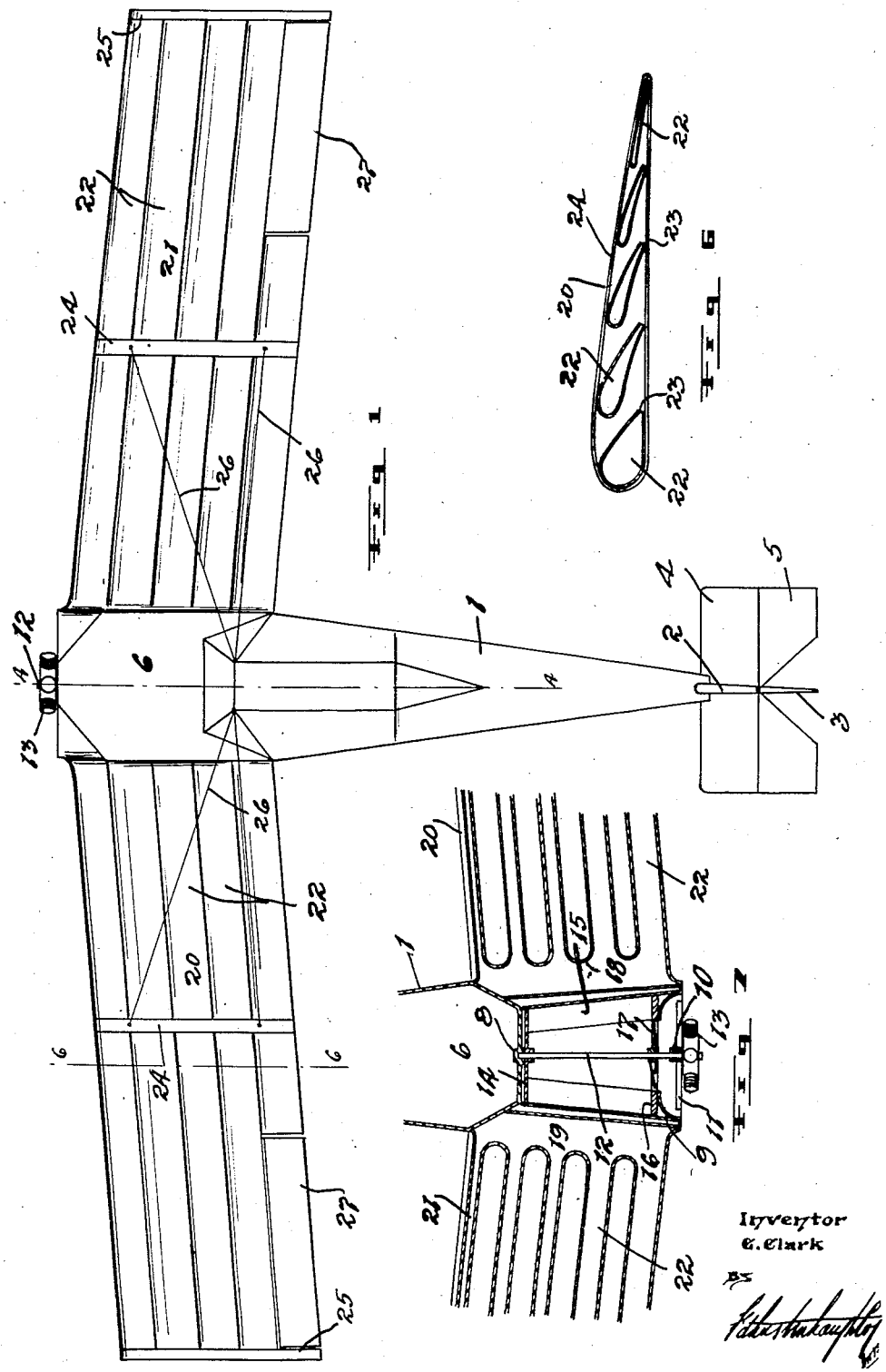

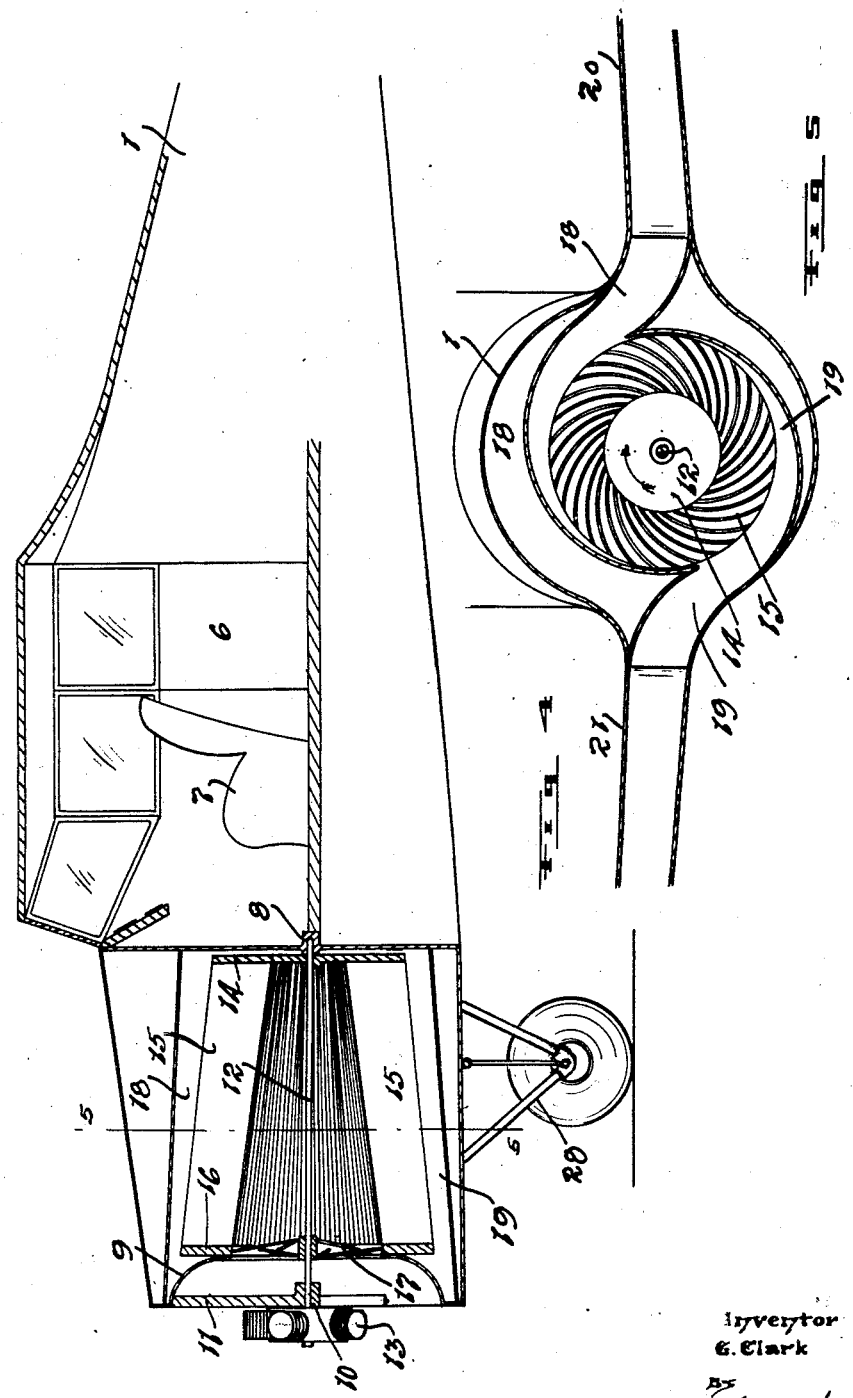

Patented Nov. 22, 1932

1,888,452

UNITED STATES PATENT OFFICE

GEORGE CLARK, OF ST. BONIFACE, MANITOBA, CANADA

AIRCRAFT

Application filed July 2, 1931. Serial No. 548,436.

The invention relates to improvements in aircrafts and particularly to aircrafts of the heavier than air type and a general object of the invention is to provide an aircraft having the wings thereof formed from a plurality of spaced hollow air foils, such foil being provided rearwardly with an air outlet and equipping the craft with a power driven blower adapted to direct air under pressure to the foils to be discharged through the outlets thereof and in a direction and manner such that an area of low air pressure is created on the top side of the wing and an area of high air pressure is created on the under side of the wing and the resultant of such pressures creates lift and flight.

A further object is to arrange the air foils with air spaces therebetween and with the leading edge of the following foil overlying the trailing edge of the foil in advance thereof and to position the foils in respect to one another so that the inclination to the horizontal of the several air passages gradually diminishes in passing rearwardly of the wing and further to design the foils of a stream line cross section and such that each foil has a longitudinally extending air escape slot in its trailing edge of predetermined width.

A further object of the invention is to design the structure so that the velocity and pressure of the air passing from the blower to the several foils and through the foils to the slots, can be maintained at a pressure and velocity for most effectively obtaining flight and lift.

With the above more important and other minor objects in view which will become more apparent as the description proceeds, the invention consists essentially in the arrangement and construction of parts hereinafter more particularly described, reference being had to the accompanying drawings, in which:—

Fig. 1 is a plan view of the machine.
Fig. 2 is a front end view.
Fig. 3 is a side view.
Fig. 4 is an enlarged detailed vertical sectional view at 4—4 Figure 1.
Fig. 5 is a vertical cross sectional view at Fig. 5—5 Figure 4.
Fig. 6 is an enlarged detailed cross sectional view at 6—6 Figure 1.
Fig. 7 is a sectional view at 7—7 Figure 2.

In the drawings like characters of reference indicate corresponding parts in the several figures.

The machine herein shown is of the well known monoplane type but it is to be distinctly understood that the improvements herein disclosed in regard to such type of machine, can be embodied with equal facility in various other types of power driven heavier than air machines and also in those forms of aircrafts known as gliders.

The fuselage 1 of the machine is of the well known stream line form and is provided rearwardly with the customary vertical fin 2, rudder 3, horizontal stabilizer 4, elevator 5 and tail skid 6, these forming no part of the present invention so that they are not further described. The fuselage embodies, forwardly, a cabin 6 containing the aviator's seat 7 and as the details of such parts may vary, they are not herein described at length. In advance of the cabin, the fuselage contains a power driven centrifugal blower and this is utilized to direct a blast of air to and through the several foils of the wings which are of the novel type of construction hereinafter described in detail.

A stationary bearing 8 is suitably carried say by the front wall of the cabin and the forward end of the fuselage supports a dished inlet ring 9 which supports centrally a bearing 10 horizontally opposite and in advance of the bearing 8 and carried by suitably radial arms 11 from the ring. The bearings support rotatably the shaft 12 on the forward end of which is mounted the engine 13 of any approved design, the engine rotating the shaft when in use. The shaft carries a rear circular plate 14 permanently secured to the shaft to rotate therewith and the plate carries a plurality of forwardly extending similar equi-spaced blades 15 which have their forward ends secured permanently to an annular disc 16 located directly to the rear of the ring. Spokes 17 extend between the disc 16 and the shaft.

It will be observed that the blades converge rearwardly so that they surround an inner frusto-conical shaped air space, the forward end of which communicates with atmosphere through the ring 9 and the rear end of which is closed by the plate 14. The fan formed by the discs and blades is obviously directly driven by the engine and atmospheric air will be drawn into the conical area within the blades and expelled outwardly between the blades upon the fan being driven by the engine in the direction of the applied arrow Figure 5. The air discharged by the blades is directed by air ducts 18 and 19 to the inner ends of the wings 20 and 21 and the design of the air ducts is so proportioned as to afford the maximum recovery from velocity pressure to static pressure with the least amount of turbulence, the air flowing evenly and smoothly in the air ducts to the wings.

It might be here mentioned that the inlet ring 9 is of stream line design, thereby reducing air entering losses to a minimum and that the impeller or wheel of the blower which embodies the discs and the blades is designed so as to keep a uniform velocity of air through the wheel and thereby reduce wheel loss.

From the above, it will be apparent that I have provided a forwardly disposed power driven centrifugal blower or fan of the multiblade type which is so mounted in the front part of the fuselage or other desirable point that the intake opening faces the direction of forward motion of the aircraft and the air discharged from the blower is directed to the inner ends of the wings through the ducts described. The wings provided are both identically constructed and accordingly the description of one will suffice.

Each wing comprises a number of hollow air foils 22 herein shown as five in number having their outer ends closed and their inner ends opening to the air ducts leading from the blower. The air foils will be made of light yet strong metal and will have the cross sectional shape best shown in Figure 6 where it will be observed also that the leading edge of each air foil overlies and is spaced from the trailing edge of the one in advance. The air foils are of stream line in shape and the trailing edge of each air foil is provided with a lengthwise extending slit or slot 23 of proper size to give egress to the contained air.

It will be observed that the forward air foils are disposed at a greater angle to the horizontal than the rear air foils, the angles gradually diminishing from front to rear of the wing with the result that there is a gradual change in the direction of the air blast from front to rear of the wing, the blast from the front foil discharging downwardly and rearwardly at a considerable angle and that from the rear foil discharging almost horizontally and rearwardly. It is to be also noticed that the cross sectional area of the foils gradually diminishes in passing outwardly from the fuselage towards the tips thereof so that an even distribution and constant velocity of air through the slots of the foils is maintained.

The several foils of each wing are suitably fastened to reinforcing bands 24 and 25 and the wing as a whole is braced by stay wires 26 extending between the band 24 and the top of the cabin. Each wing is provided with an aileron 27 of well known design, the controls of which are not herein shown. The forepart of the fuselage is supported by an under carriage 28 of any approved design.

From the above, it will be apparent that I have provided a heavier than air aircraft of improved design wherein the wings are formed each from a plurality of spaced hollow air foils having rear air outlets, air under pressure being supplied to the foils by a power driven blower mounted on the machine and expelled from the foils through the slits of the foils.

When the machine is in operation, the arrangement is such that I create a low pressure area above the wings and a high pressure area below the same which is obviously very desirable. The air discharging at high velocity from the air foils creates a high pressure area underneath the wings and also induces secondary air currents to flow through the spaces between the individual air foils, the effect of which not only reduces the air pressure on the upper side of the wing but increases the air pressure on the under side of the foils. The forward and upward inclination of the space in between the air foils together with the downward and backward discharge of air from the trailing edge of each foil re-acts to give a general upward and forward motion to the whole craft which results in lift and flight when sufficient power is applied to induce the required difference in pressure between the upper and lower faces of the wings.

It is believed that the lift component generated will be greatly in excess of the drag component so that the resultant force will work more nearly vertical than is possible with the popular designs now at present in use. Attention is directed also to the fact that the application of power to an aeroplane by this means utilizes the full available and useful power of the machine to the majority of the lifting area direct and at a static position and it is accordingly expected that the aeroplane provided with my invention will rise from the ground without the necessity of first attaining a horizontal velocity sufficient to be transposed into lift as is common practice at present.

While I have shown the machine as power driven, I might point out that the invention can be used to advantage in gliders where it would not be necessary to provide the engine and the wheel driven thereby provided the glider had reached sufficient elevation and was gliding. It will be apparent that the air entering through the disc 9 at a high velocity will be distributed to the foils in the same manner as hereinbefore described and will have much the same effect in producing an area of high air pressure on the under side of the wings and an area of low air pressure on the top side thereof.

What I claim as my invention is:—

1. In a heavier than air aircraft, a wing formed from a plurality of hollow spaced air foils extending longitudinally of the wing and having the leading edge of a following foil overlying the trailing edge of the foil in advance thereof and the trailing edges of the foils provided with restricted air outlets and means for directing air under pressure to the interior of the foils.

2. In a heavier than air aircraft, a wing formed from a plurality of hollow spaced air foils extending longitudinally of the wing and having the leading edge of a following foil overlying the trailing edge of the foil in advance thereof and the trailing edges of the foils provided with restricted air outlets and the several foils set at varying angles to the horizontal plane and means for admitting air under pressure to the interior of the foils.

3. In a heavier than air aircraft, a wing formed to provide a plurality of spaced longitudinally extending hollow air foils having restricted air outlets provided in their trailing edges and a power driven blower communicating with the foils of the wing to deliver air under pressure to the interior of the foils.

4. In a heavier than air aircraft, a wing formed from a plurality of spaced hollow foils receiving air under pressure and having restricted air outlets, the foils being disposed in relation one to the other that the air discharging through the outlets causes an area of increased pressure on the under side of the wing and an area of decreased pressure on the top side thereof.

5. In a heavier than air aircraft, a wing formed from a plurality of longitudinally extending spaced hollow air foils of stream line cross section and positioned with the leading edge of any following foil overlying the trailing edge of the foil directly in advance thereof and having the trailing edge of each foil provided with a restricted air outlet passage and means for admitting air under pressure to the several foils.

6. In a heavier than air aircraft, a wing formed from a plurality of longitudinally extending spaced hollow air foils of stream line cross section and gradually diminishing in cross sectional area from their inner ends outwardly to the tip of the wing and positioned with the leading edge of any following foil overlying the trailing edge of the foil directly in advance thereof and having the trailing edge of each foil provided with a restricted air outlet passage and means for admitting air under pressure to the several foils.

7. A heavier than air aircraft having the wings thereof each formed from a plurality of spaced hollow air foils extending longitudinally of the wing and positioned with the leading edge of any foil overlying the trailing edge of the foil directly in advance thereof and having the trailing edges of the foils provided with restricted air outlets and an air chamber communicating with the foils and having the forward end thereof open to gather and direct air under pressure to the foils when the aircraft is in flight.

8. A heavier than air aircraft having the wings thereof each formed from a plurality of spaced hollow air foils extending longitudinally of the wing and positioned with the leading edge of any foil overlying the trailing edge of the foil directly in advance thereof and having the trailing edges of the foils provided with restricted air outlets and a power driven air blower mounted on the aircraft and communicating with the interior of the foils.

Signed at Winnipeg, this 5th day of June, 1931.

GEORGE CLARK.